(12) United States Patent
Bordenyuk et al.

(10) Patent No.: US 11,817,670 B2
(45) Date of Patent: Nov. 14, 2023

(54) PULSE CONFIGURABLE FIBER LASER UNIT

(71) Applicant: IPG PHOTONICS CORPORATION, Oxford, MA (US)

(72) Inventors: Andrey Bordenyuk, Shrewsbury, MA (US); Dmitry Pestov, Westborough, MA (US); Vadim Lozovoy, Marlborough, MA (US); Igor Samartsev, Westborough, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 1088 days.

(21) Appl. No.: 16/561,968

(22) Filed: Sep. 5, 2019

(65) Prior Publication Data

US 2020/0076151 A1 Mar. 5, 2020

Related U.S. Application Data

(60) Provisional application No. 62/727,273, filed on Sep. 5, 2018.

(51) Int. Cl.
| | |
|---|---|
| *H01S 3/067* | (2006.01) |
| *H01S 3/00* | (2006.01) |
| *H01S 3/08* | (2023.01) |
| *H01S 3/1106* | (2023.01) |
| *G02F 1/00* | (2006.01) |
| *G02F 1/01* | (2006.01) |

(Continued)

(52) U.S. Cl.
CPC ............ *H01S 3/06725* (2013.01); *G02F 1/00* (2013.01); *G02F 1/01* (2013.01); *G02F 1/11* (2013.01);

(Continued)

(58) Field of Classification Search
CPC ..... G02F 1/00; G02F 1/01; G02F 1/11; G02F 1/113; G02F 1/33; G02F 2203/12;
(Continued)

(56) References Cited

U.S. PATENT DOCUMENTS

| | | | |
|---|---|---|---|
| 6,879,426 B1 * | 4/2005 | Weiner | H04B 10/2513 359/279 |
| 7,088,756 B2 * | 8/2006 | Fermann | H01S 3/06708 372/18 |

(Continued)

FOREIGN PATENT DOCUMENTS

| | | | | |
|---|---|---|---|---|
| CN | 107340565 A | * | 11/2017 | ......... G02B 6/02123 |
| CN | 115427879 A | * | 12/2022 | ........... G02F 1/3503 |

(Continued)

*Primary Examiner* — Thomas A Hollweg
*Assistant Examiner* — Mary A El-Shammaa
(74) *Attorney, Agent, or Firm* — Yuri B. Kateshov, Esq.

(57) ABSTRACT

A pulse configurable laser unit is an environmentally stable, mechanically robust, and maintenance-free ultrafast laser source for low-energy industrial, medical and analytical applications. The key features of the laser unit are a reliable, self-starting fiber oscillator and an integrated programmable pulse shaper. The combination of these components allows taking full advantage of the laser's broad bandwidth ultra-short pulse duration and arbitrary waveform generation via spectral phase manipulation. The source can routinely deliver near-TL, sub-60 fs pulses with megawatt-level peak power. The output pulse dispersion can be tuned to pre-compensate phase distortions down the line as well as to optimize the pulse profile for a specific application.

15 Claims, 8 Drawing Sheets

(51) Int. Cl.
  *G02F 1/11* (2006.01)
  *G02F 1/33* (2006.01)
(52) U.S. Cl.
  CPC ............... *G02F 1/113* (2013.01); *G02F 1/33* (2013.01); *H01S 3/0057* (2013.01); *H01S 3/06716* (2013.01); *H01S 3/08013* (2013.01); *H01S 3/1106* (2013.01); *G02F 2203/12* (2013.01); *G02F 2203/25* (2013.01); *G02F 2203/26* (2013.01); *H01S 3/06704* (2013.01)
(58) Field of Classification Search
  CPC ............ G02F 2203/25; G02F 2203/26; H01S 3/0057; H01S 3/06716; H01S 3/08013; H01S 3/1106; H01S 3/06704; H01S 3/06725
  See application file for complete search history.

(56) References Cited

U.S. PATENT DOCUMENTS

| | | | | |
|---|---|---|---|---|
| 2009/0141341 | A1* | 6/2009 | Gaudiosi | H01S 3/2308 359/341.1 |
| 2013/0182620 | A1* | 7/2013 | Chaffee | H04J 14/06 398/43 |
| 2018/0348145 | A1* | 12/2018 | Witte | G01N 21/9501 |
| 2019/0129278 | A1* | 5/2019 | Ichihara | G02F 1/365 |

FOREIGN PATENT DOCUMENTS

| | | | | |
|---|---|---|---|---|
| WO | WO-2005030386 A1 * | 4/2005 | | B01J 19/121 |
| WO | WO-2007038527 A1 * | 4/2007 | | G01N 23/223 |
| WO | WO-2007064703 A2 * | 6/2007 | | G01N 21/21 |
| WO | WO-2019050724 A1 * | 3/2019 | | G02B 27/0944 |

\* cited by examiner

FIG. 4
known art

PULSE CONFIGURABLE FIBER LASER UNIT

BACKGROUND OF THE INVENTION

Field of the Disclosure

The invention pertains to a commercial ultrashort pulse fiber laser unit based on a self-starting ytterbium (Yb) fiber oscillator with cross-filter mode lock (CFML) mechanism that is integrated with a programmable pulse shaper. In particular, the invention relates to a compact laser unit with integrated together ultrashort pulsed fiber laser source and a compact spectral phase shaper utilizing a phase modulator for active phase control, which enables high-finesse pulse compression as well as arbitrary manipulation of the pulse waveform.

Background of the Disclosure

The application space for ultrashort pulse lasers has become extremely broad, including but not limited to machining and processing of materials, high-field laser-matter interactions, ultrafast time-resolved spectroscopy, nonlinear microscopy, and etc. Each of the listed applications benefits from rugged, compact, and robust pulsed sources capable of outputting reproducible single mode (SM) pulses in a femtosecond (fs)-picosecond (ps) time range.

Lasers that emit pulses of tens of femtoseconds in duration (1 fs=$10^{-15}$ s) are used mainly for research and development, where requirements for environmental stability are not strict. Output pulse energy for such lasers may vary in a very broad range, from several nanojoules and higher. Their repetition rate also varies broadly, from 1 kHz to 100 MHz. There are many industrial applications that do not require high pulse energy, given such short pulse duration, but are in need of reliable lasers, simple in handling to allow operation by users not skilled in laser technology, like biologists, chemists, or physicians, and tolerant to industrial environment. Laser-assisted processing of optically transparent solid materials, like glasses or sapphire, which includes bulk modification for 3-D structuring, surface etching, and direct bonding may require pulse energies as low as 200-300 nanojoules (nJ), combined with a few hundred or sub-hundred femtosecond pulse duration. Analytical applications require even lower pulse energy in combination with shorter pulse duration to ensure nondestructive interaction. These applications include multiphoton microscopy and spectroscopy that benefit not only from short pulse duration and high beam quality, but also from controllable spectral phase and temporal pulse profile for selective chromophore excitation when an ensemble of different chromophores is investigated. Laser-assisted crystallization or nucleation finds application in pharmaceutical industry and. Two-photon polymerization for lithography and 3-D printing or micro-structuring uses pulse energies from a single nJ to tens of nJs, given the pulse duration is less than 100 fs. Similar pulse parameters are in use for photoporation and transfection, which became widely used processes in today's gene manipulation procedures performed on living cells. The number of applications where low-energy femtosecond pulses can be successfully used is quickly growing.

The common feature of all the aforementioned applications is the requirement for a "cold" process where heat dissipation is suppressed or strongly mitigated and can be effectively controlled in both time and volume. This is achieved by using shorter pulses<100 fs and preferably <50 fs, which ensures minimal or no thermal effect caused by radiation on the region of interest. The realization of "cold" interaction regimes allows maximizing purely nonlinear processes without destruction associated with accumulation of energy excess, inherent to longer pulses.

The development of fs pulse lasers cannot be separated from the development of the titanium-doped sapphire (Ti:sapphire) laser gain material. Ultrafast laser pulses require a broad spectral bandwidth. The Ti:sapphire, with its gain bandwidth spanning the near-infrared (near-IR) from <700 to >1000 am, is the champion in this regard.

Nevertheless, in recent years other technologies have made inroads. For example, fiber lasers, disclosed in this application, are now generating pulses<100 fs in duration, as are other ytterbium (Yb)-crystal based lasers. There are a few reasons for using fiber lasers instead of Ti:sapphire gain media. One of the reasons includes low cost, compactness, simplicity with tunability and pulse duration and reliability.

Another reason is that the broad bandwidth of Ti:sapphire requires a large wavelength interval between the pump light and the laser light—that is, a large quantum defect. This also means significant thermal dissipation. In Yb-doped lasers (including Yb-fiber), the quantum defect is several times smaller, as is made possible by the far narrower gain bandwidth.

Yet the narrow gain spectrum of the Yb fiber gain media can also be very problematic. Having the broad gain spectrum, Ti:sapphire gain media are capable of maintaining the evolution of fs pulses without the necessity of spectrally broadening these pulses beyond a Ti:sapphire oscillator before the pulses are amplified in a Ti:sapphire amplifier which has the same broad gain spectrum as the oscillator.

In contrast, Yb fiber oscillators and amplifiers have a substantially narrower gain spectrum. The Yb oscillator can be configured to output coherent broadband pulses. But further pulse amplification is not possible because Yb-doped fibers, as its nature dictates, can amplify only a small spectral region. The rest of the broad spectral line remains unaffected. But most of the ultrafast laser applications require the amplified broadband fs pulse.

Several methods of generating ultrafast pulses in the fiber gain media are well known. One of these methods—passive mode locking—is part of the disclosed subject matter. The key to the passive modelocking is the presence in a ring cavity of at least one component that has a nonlinear response to increasing peak intensity.

Unlike other laser systems, mode-locked fs fiber lasers are sensitive to the group velocity dispersion (GVD) when propagating through any medium. The GVD is a characteristic of a dispersive medium used to determine how the medium will affect the duration of an optical pulse traveling through it. More specifically, the GVD is the frequency dependence of the group velocity of light in a transparent medium. In the context of ultrashort pulses, the GVD is manifested by a giant chirp due to the effects of nonlinearity, e.g. self-phase modulation.

The term "giant chirp" as used here refers to the key characteristic of the resulting oscillator output pulses. Typically, the high energy giant chirped output pulse will have a duration at least tens of picoseconds and more, which eliminates the need for an external pulse stretcher and thus allows the use of increased power levels in the mode-locked oscillator. The giant chirped pulses can be compressed with a compressor to femtoseconds in order to extract higher pulse energies, but such a compression is not simple as explained immediately below.

Assume that Yb fiber laser generated pulses each acquire a giant chirp having a full width (FW) of 90 nm. Using a pair of gratings, it is possible to compress each pulse to, for example, a $\tau_{FWHM}$ 85 fs pulse. But is the 85 fs duration the lowest limit for the given band? No. Theoretically, of course, any fully coherent pulse may be compressed to the lowest possible duration for a given time-bandwidth-product of this pulse which is referred to as either transform limited (TL) or Fourier transform (FT) pulse. For example, the same 90 nm chirped pulse has the transform limited $\tau_{FWHM}$ of about 50 fs. The question is where those parasitic 35 fs are acquired.

The duration of an ultrashort laser pulse is limited by its bandwidth, spectral shape and the degree to which all its frequencies are in phase. The generation of transform-limited pulses depends on how accurately phase distortions inside and outside the laser can be measured and corrected. The task for producing TL pulses is rather simple: compensate the giant chirp.

The chirp, propagating through optical fibers and fiber components, acquires linear and nonlinear components of the GVD, wherein the nonlinear component corresponds to a third- or higher order dispersion (TOD) resulting from the frequency dependence of the GVD. The linear dispersion component compensation of the chirp with static compressors, such as volume and fiber Bragg gratings (VBG, FBG respectively) or surface gratings, is well known. However static compressors may not only be ineffective when dealing with the nonlinear component, but they are also known to introduce the additional and significant TOD. The mechanism correcting the nonlinear component is referred to as a pulse shaper.

There are a few known programmable pulse shapers provided with algorithms, such as the multiphoton intrapulse interference phase scan (MIIPS), that are used to assist in compensating nonlinear (and sometime linear) components in the following manner. The programmable pulse shaper incorporates a liquid crystal spatial light modulator (SLM) capable of introducing a well-calibrated phase function across the laser spectrum. The reference phase function is one that causes a local correction to the second derivative—group dispersion (GD) measured in $fs^2$ or $ps^2$—of the spectral phase and higher order derivatives. As it scans across the spectrum of the laser, the maximum intensity in the second-harmonic signal scans as well such that the phase shift introduced by the modulator has the same value but opposite sign to the original pulse maximum of the second harmonic. In the absence of phase distortions, there is a linear relation between the two; phase distortions change this relation. The results obtained through the tracking phase deviation form a correction function. Upon double integration of the correction function, the deviations yield the phase distortions. Once phase distortions are measured, the pulse shaper corrects a pulse shape.

The difficulty of operating the MIIPS-controlled pulse shaper is well known to one of ordinary skill in the ultrashort pulse laser arts. Typically, the tuning and operation of the pulse shaper requires a team of physicists all with the PhD degree. Different operational regimes of a pulse generator, i.e., different pulse durations, output pulse energies and pulse shapes both in time and frequency domains, require different phase masks or phase and amplitude masks. Also, a single phase mask working well for one of the group of identically configured pulse laser generators unlikely properly operates in combination with another pulse generator of the same group. It all leads to an unacceptable cost and labor inefficiency.

One of the known known programmable pulse shapers is an acousto-optical modulators (AOM) in which a radio-frequency electrical signal drives a piezoelectric transducer launching a traveling acoustic wave. Modulator action is based on diffraction of the light beam from refractive index changes induced by the traveling acoustic wave. The diffracted beam is shifted in frequency by an amount equal to the electrical drive frequency, ideally with an amplitude and phase that directly reflect the amplitude and phase of the RF drive. A liquid crystal phase modulation (LCoS) can also be utilized. Alternatively, an acousto-optical programmable dispersive filter (AOPDF) can be used. In AIPDF the acoustic wave co-propagates with the optical field to rotate the field polarization and thereby, change the optical delay. By using an electronic arbitrary waveform generator to drive the AOM, the acoustic profile can be controlled, and programmable pulse shaping achieved. However, both AOMs and AIPDFs require synchronization with the laser source and typically may not run at the desired high pulse repetition rate (PRR), which somewhat limits their application.

Regardless of the configuration, a programmable pulse shaper is a complex tool used in the laboratory. Typically, a fiber laser ultrashort pulse system is assembled in situ from different components: a mode-locked oscillator, which outputs short pulses, stretcher, and a programmable pulse shaper facilitating pulse compression. The assembled system is bulky and requires complicated tuning which is typically done by a team of highly educated personnel.

A need exists for a fs fiber laser system suitable to satisfy requirements of "cold start" and other applications, and enhanced by the capability of programming the spectral phase and thereby, the temporal pulse shape.

Another need therefore exists for a reliable fs fiber laser system capable of maintaining the evolution of amplified broadband pulses.

A further need exists for an industrial ultrashort laser unit which integrates a mode-locked fs fiber laser, programmable pulse shaper and a computer, operative to control and coordinate the operation of the fiber laser and pulse shaper, into a single unit.

SUMMARY OF THE DISCLOSURE

The disclosed industrial ultrashort pulse fiber laser system provides a reliable femtosecond laser suitable to satisfy these needs and enhanced by the capability of programming the spectral phase and/or amplitude and thereby, the temporal pulse shape.

The laser is self-starting, resilient to vibrations and shock and preferably operates as a seed for high-power femto- and pico-second laser systems. Advantageously the laser system includes an additional power amplification module capable of increasing the pulse energy. The laser output is fully coherent, and pulses are compressible down to the transform limit (TL). The laser system is configured with a laser head housing a static grating compressor and compact spectral phase shaper. The pulse shaper utilizes a liquid-crystal spatial light modulator (SLM) or acousto-optical modulator (AOM) for active phase control which enables high-finesse pulse compression as well as arbitrary manipulation of the pulse waveform.

In accordance with one aspect of the disclosure, a pulse configurable coherent fiber laser unit includes a Yb fiber ring resonator with cross-filter mode lock (CFML) outputting strongly chirped fs-ps pulses. The disclosed unit is further configured with a compressor operative to compress the chirped pulses to the TL and a central processing unit (CPU).

The CPU executes the MIIPS software for operating the compressor such that it outputs the TL pulses for any given regime of the CFML. The CPU also executes the MIIPS software for retrieving the desired mask applied across a TL pulse to obtain the desired pulse shape. There are a variety of features characterizing the configuration and function of fiber laser unit of this aspect; the features can be used together or individually or in any reasonable combination with one another not compromising the principle of the unit's operation.

One of many salient features of the laser unit configured in accordance with the above-disclosed aspect is provided with an additional amplification stage including an Yb fiber amplifier or booster which has all its structural elements identical to respective elements of the fiber ring resonator, but arranged in a linear geometry. However, the active and passive fibers of the booster have respective fiber core diameters larger than those of the ring resonator. The structural similarity of the booster and ring resonator allows for amplification of a broad spectrum that can reach a 100 nm spectral line.

Preferably, the disclosed laser unit has an intermediary or preliminary Yb amplification stage between the ring resonator and booster. Functionally, the preliminary Yb amplifier having a typical Yb gain spectrum of 50 nm or less, cuts the spectral width of the resonator generated pulses. This is rather advantageous because the resonator-generated broadband pulses coupled directly into the booster can acquire such a high energy that the fibers can be destroyed. However, even with a relatively short amplified spectrum at the output of the preamplifier, the pulses acquire the energy sufficient to cause a self-phase modulation nonlinear effect leading to spectral (and temporal) broadening of the pulse.

Another salient feature of the laser unit of the above-disclosed aspect relates to the programmable compressor which in combination with the CPU provides compression of the chirped pulses to the TL. The compressor is configured with two stages which include a static compressor operative to compensate for the bulk of the linear chirp component and a programmable pulse shaper correcting for the residual linear chirp and nonlinear dispersion, which are further referred to as a nonlinear component of the chirped pulses. The calibration of the inventive unit thus includes calculating the nonlinear chirp component and controlling the pulse shaper to apply the nonlinear chirp with the opposite sign, i.e., phase and/or amplitude masks. The nonlinear chirp however depends on the operational regime of the pulse generator 52 including a pulse repetition rate (PRR) at the output thereof. The latter is a function of pump light intensity exciting the gain medium of the resonator and controllable by a signal from the CPU which generates this signal in response to an external request inputted into the CPU through a user interface. Collecting data corresponding to different operational regimes helps establishing a library of the masks necessary to compress the chirp pulses to respective TLs and stored in the memory of CPU.

According to still another feature of the inventive laser disclosed in the above disclosed aspect, the pulse shaper can be controlled not only to help compress the chirped pulses to respective TLs, but also to apply the desired shape to the TL pulses. In other words, once the pulse dispersion is accounted for and compensated (if necessary), it is straightforward to use the shaper to alter the spectral phase and/or amplitude and thereby, generate other optical waveforms. Again these masks can be either stored in the memory of the CPU or generated in situ by the trained personnel and again stored.

Yet a further feature of the laser unit of the above-disclosed aspect relates to the utilization of pulse picker to modify the PRR or/and the number of pulses needed for any given application. The pulse picker may be located between the pre-amplifying and booster stages or downstream from the booster stage.

A further aspect of the disclosure includes a method of operating the inventive pulse configurable coherent fiber laser unit. Like the unit itself, the method is characterized by various features that can be used all together or in any possible combination with one another.

BRIEF DESCRIPTION OF THE DRAWINGS

The above and other features of the disclosed laser unit are further discussed in detail to become more readily apparent in conjunction with the following drawings.

SPECIFIC DESCRIPTION

Figure 1:
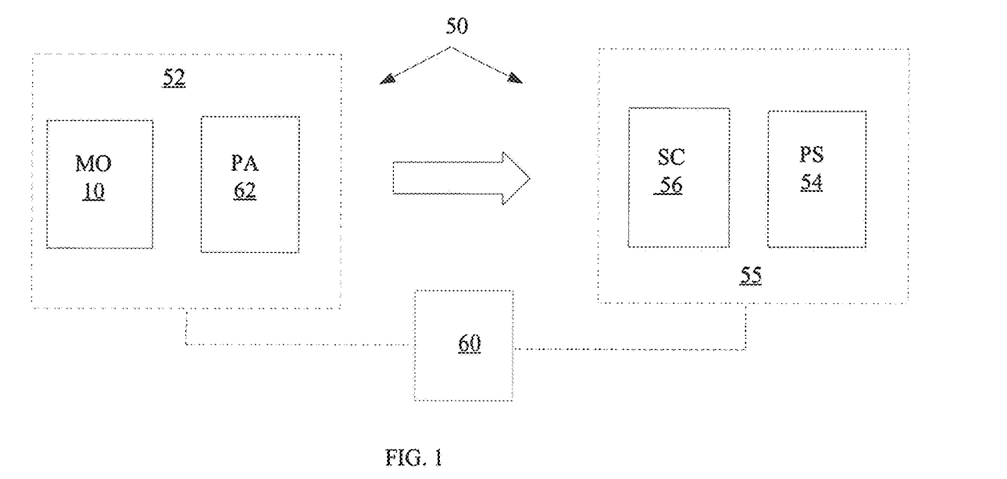
FIG. 1 is a block diagram of the basic configuration of the disclosed fiber laser unit.

FIG. 1 illustrates a basic configuration of commercial coherent laser unit 50. The latter includes a laser source or fiber pulse generator 52 which is configured with a passively mode-locked master fiber oscillator 10 and, optionally, power fiber amplifier 62. The oscillator 10 and amplifier 62 have thus a MOPFA architecture with the oscillator 10 being a seed. The laser unit 50 outputs a train of single mode (SM) broadband coherent pulses. For example, each pulse may have a FWHM of up to 100 nm, pulse duration r of 10-15 ps, average power Pav from 100 to 150 mW and pulse energy Ep of at least 1 MW. The output ps pulses each are generated with a giant chirp that only increases when the ps pulses interact with a fiber medium. The chirp development involves a gradual formation of linear and nonlinear components. The compensation of both chirp components leading to the compression of chirped pulses to respective TL pulses, can be performed by a combination of static compressor 56 operative to compensate a major part of linear chirp and programmable pulse shaper 54 or sometime only by pulse shaper 54 dealing with the remaining part of the linear chirp and high order dispersion. Both pulse generator 52 and pulse shaper 54 are controllable by a common or respective individual computers 60. The static compressor 56 and pulse shaper 54 are preferably mounted in a laser head 55 which can be coupled to pulse generator module 52 by a flexible cable. Alternatively, all three main components may be enclosed in the same housing.

Figure 2:
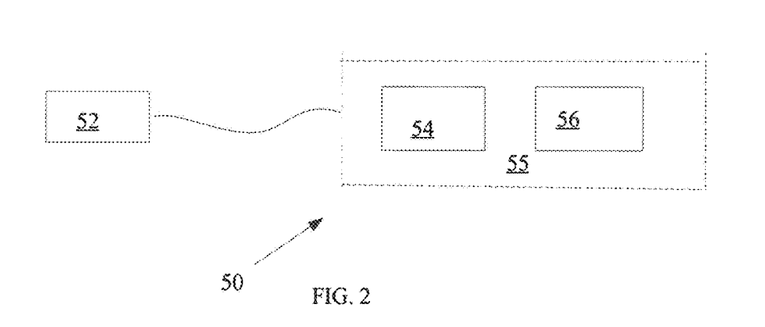
FIG. 2 is a block diagram of one modification of the basic configuration of FIG. 1.
Figure 3:
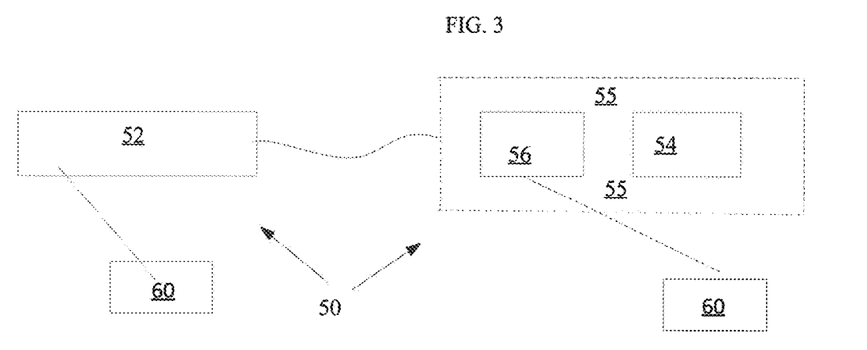
FIG. 3 is a block diagram of another modification of the basic configuration of FIG. 1.

Turning to FIG. 2, static compressor 56 is positioned downstream from shaper 54. It is important to remember that while the static compressor compensates a linear chirp component, it also introduces additional nonlinearities that have to be taken into account. FIG. 3 shows an alternative configuration of laser unit 50 in which compressor 56 is located between pulse generator 52 and shaper 54. Similar to FIG. 2, shaper 54 of FIG. 3 compensates the nonlinear chirp and the remaining portion of the linear chirp.

The selection of any of the above configurations of unit 50 shown in FIGS. 1-3 depends on the parameters of pulses output by pulse generator 52 and the modulation depth of pulse shaper 54. It is perfectly reasonable to expect unit 50 to operate in a range of pulse durations varying between about 50 fs to about 50 ps. The laser unit 50 of any of FIGS. 1-3 is operative to compress broadband coherent ps pulses from pulse generator 52 to respective nearly TL pulses. For example, if generator 52 outputs a Gaussian FWHM 90 nm broadband 1.5 ps pulse centered at 1030 nm wavelength, it can be effectively compressed at the output of unit 50 to about 51-52 fs. For all practical purposes, the latter can be referred to as a TL pulse since theoretically the shortest pulse duration for the 90 nm pulse is 50 fs and even less.

Figure 4:
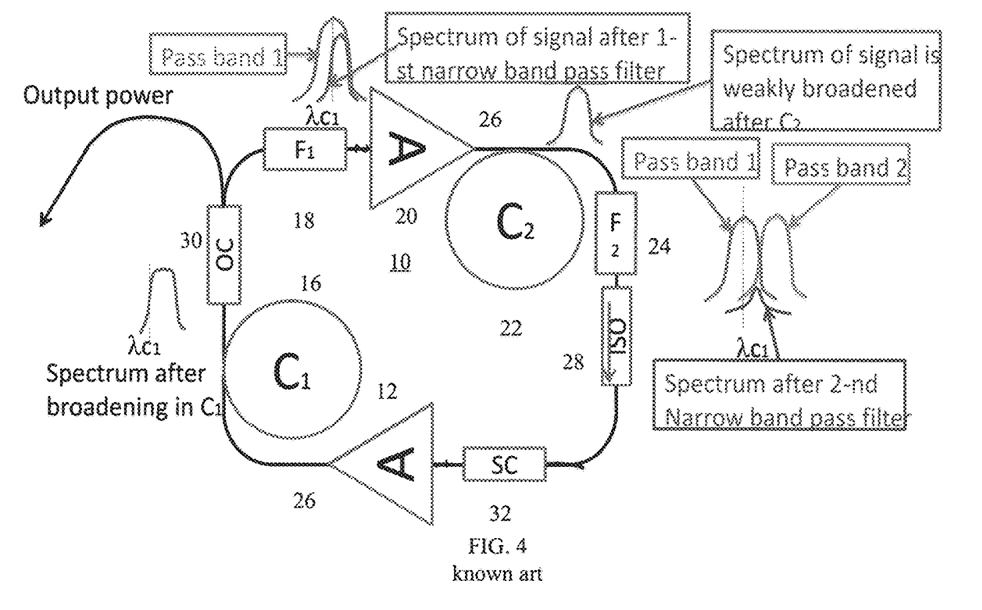
FIG. 4 is an exemplary schematic of the pulse generator of the disclosed laser unit.

FIG. 4 illustrates the schematic of pulse generator 52 configured as a self-starting passively mode-locked laser which is disclosed in greater detail in U.S. Provisional Patent Application No. 62/091,817 incorporated herein in its entirety by reference. The pulse generator 52 is based master oscillator 10, further referred to ring resonator 10 in which outputs of respective fiber amplifiers 12 and 20 seed one another. Between the first and second amplifiers 12 and 20, two or more identical groups or chains of fiber elements are coupled together to a define ring cavity 10. Besides the fiber amplifier, each chain includes a fiber coil 16, 22 which provides respective periodic spectral and temporal broadening of signal and narrow line filters 18, 24 operative to spectrally filter the broadened signal. The filters may have substantially the same bandwidth but configured so that respective spectra overlap one another. Alternatively, one of the filters may be configured with a bandpass which is at most five (5) times broader than the bandpass of the other filter with the obligatory overlap of their spectrums which ensures the laser's self start. The illustrated configuration of self starting pulse generator 52 providing sequential spectral broadening and filtering leads to generation of giant chirped pulses with a substantially uniform duration, spectrum and amplitude.

The ring resonator 10 further includes one or more isolators 28, providing the unidirectional guidance of light around the waveguide, and one or more output couplers 30 positioned immediately downstream from respective fiber coils 16, 22. The output couplers each guide the chirped pulse outside ring resonator 10. To intensify the desired population inversion in a gain medium of the amplifiers, i.e., to start the operation of the inventive pulse generator, one or two CW pumps 26 are coupled to respective amplifiers. All of the above-disclosed components are interconnected by single transverse mode (SM) passive fibers. The amplifiers 12 and 20 each may be based on a SM or MM fiber doped with an appropriate rare earth ions, such as ytterbium (Yb). All fibers have respective substantially uniformly dimensioned cores with mode field diameters (MFD) which substantially match one another. In use, the illustrated scheme is characterized by nonsaturated start-up and saturated steady-state pulse generation (modelocked) phases.

Figure 5:
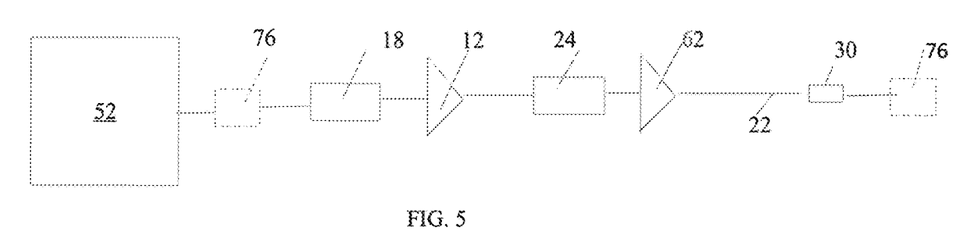
FIG. 5 is an optical schematic of the pulse generator of FIGS. 1 to 3.

FIG. 5 illustrates an optical schematic of pulse generator 52 configured with additional optical fiber elements which desirable to provide higher pulse energies. As mentioned above, all fibers of ring resonator 10 have a uniform small core diameter typically not exceeding 12 µm. While the cores of respective fibers can be increased to support propagation of SM light with greater MFD, the pulse energy as a function of MFD may become prohibitively high at the start of generator 52 since pulses guided through the schematic of FIG. 4 in the beginning are overly long. The longer pulses provide higher energy that can jeopardize the integrity of the cavity components.

To avoid prohibitively excessively high pulse energies and yet to obtain maximum possible pulse energies at the output of ring resonator 10, the disclosed pulse generator 52 further includes an additional amplifying cascade 62 which is a linear analog of ring cavity 10 of FIG. 4. The amplifying cascade 62 may be provided as a separate module or mounted together with the ring resonator and includes the same very components as pulse generator 52. Thus, like ring resonator 10, additional amplifying cascade 62 is configured with filters 18, 24 with overlapping spectra, SM passive fibers interconnecting the components, isolators 30 and amplifiers 12 and 20. The opposite ends of the active fiber of amplifying cascade 62 are coupled to respective input and output SM fibers 22 with all three fibers having respective cores with matching core diameters. The latter are greater than the diameter of all other fibers located upstream from amplifying cascade 62. The doped core fiber of amplifier 62 is typically, but not necessarily tapered at the downstream end thereof to provide higher thresholds for nonlinear effects.

Regardless of the configuration of pulse generator 52, disclosed unit 50 may be configured with a pulse picker 76 operative to control the desired number of pulses and optionally frequency at which unit 50 outputs a train of ultrafast pulses. The pulse picker 76 is located either upstream from additional amplifying cascade 62 or downstream therefrom.

Figure 6:
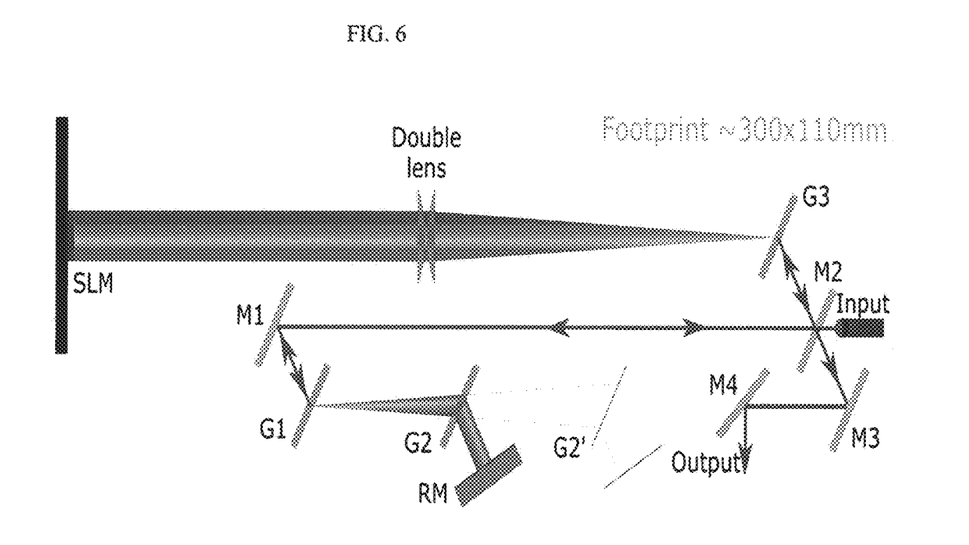
FIG. 6 is an optical schematic of a pulse modulator including a static compressor and a folded-4f pulse shaper.

FIG. 6 illustrates the optical schematic of the chirp-compensating mechanism including two stages—a static pulse compressor 56 and pulse shaper 54 of FIGS. 1-3. In the shown schematic, the static pulse compressor 56 receives broadband coherent chirped pulses from pulse generator 52 which initially propagate through guiding mirrors M2 and M1 before being compressed by a static compressor, which includes two transmission gratings G1 and G2 and a roof mirror RM. The operation of the static compressor provides for correcting a linear chirp component in broadband coherent chirped pulses. The mechanism of the static compressor is well known to one of ordinary in the laser arts and operates to at least minimize the second order dispersion (SOD) referred hereto as the linear chirp component of the chirped pulse. The partly compressed pulses further propagate in a direction opposite to the initial one from mirror M2 to M1. However, the static compressor does not address the nonlinear component of the chirped pulse. Moreover, it adds about $0.73 \times 10^6$ fs$^3$ of the third-order dispersion (TOD).

The compression-adaptive stage—folded-4f pulse shaper 54—is commonly used for fs pulse shaping and enables further refinement of the laser pulse profile by dispersing the laser spectrum across the linear phase modulator so as to directly manipulate the spectral phase regardless of the laser repetition rate. In other words, pulse shaper 54 is operative to deal with the nonlinear chirp.

The pulse shaper 54 is configured with a dispersive transmission grating G3, collimating lens or double lens L that make an incident beam including several color beamlets which propagate parallel to one another. The parallel beamlets of the shown red, blue and green colors are incident on a pixelated linear 1D or 2D SLM. Finally, the dispersed beam is reflected back parallel to the incident beam, but the reflected beam is vertically spaced from the incident beamlets while being guided through grating G3, mirrors M3 and M4 towards the output of the compressor mechanism, gaining nearly a TL pulse or with modulated phase shift. Since all beam shaping optical components are positioned in a vertical plane, the overall footprint of the compressor mechanism is small. As shown, the compressor mechanism is dimensioned to be about 300×100 mm which is very compact. The pulse shaper 54 is controlled by computer 60 executing a software based on MIIPS algorithm, which measures the residual spectral phase and corrects for TOD and higher-order dispersion, and is executed by computer 60.

When a 2D LCOS SLM is used, one can shape both spectral phase and amplitude by utilizing "diffractive shaping" mode. In this implementation, the broadband light is spectrally dispersed and focused along one axis of the LCOS SLM (e.g., horizontal) but it is not focused along the other, orthogonal axis (vertical). A periodic, sawtooth phase pattern, similar to profiles on plane-ruled surface gratings, is encoded along every column of SLM pixels. The laser light is diffracted by this encoded pattern. The spectral phase, added to the diffracted light, can be altered within the full $0$-$2\pi$ range by shifting the periodic pattern along the vertical axis, independently for every SLM pixel column. The depth of the periodic phase modulation for any given SLM pixel column determines the light diffraction efficiency for the corresponding spectral component, and thereby, the laser spectrum at the shaper output.

Depending on the number of pixels of the SLM, the use of the static compressor can be unnecessary since the SLM with a large number of pixels, for example 400-500, is operative to deal with both linear and nonlinear chirp components. Instead of the shown folded-4f pulse shaper based on the LCOS SLM, the pulse shaper may be based on an AOM or AOPDF. The operation of the disclosed schematic is the same as when the nonlinearly chirped component is compensated by pulse shaper 54 before compressor 56 deals with the linear chirp component.

Figure 7:
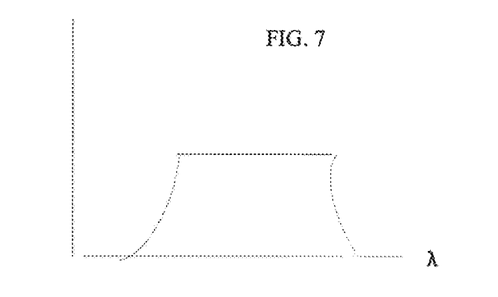
FIG. 7 is a flat-top pulse shape obtained by the method of operating the disclosed laser unit.

Referring to FIG. 7, the pulse shaper 54 also offers the capability of reshaping TL pulses by modifying the phase mask or profile applied to the SLM, as disclosed immediately below. Thus pulse shaper 54 may operate in many industrial applications requiring pulses with arbitrary shapes different from the nearly Gaussian shape of the TL pulse. For example, as can be seen in FIG. 7, the phase mask is modulated to form flat top pulses. Practically any pulse shape may be formed utilizing pulse shaper 54 and its software readable media.

The pulse shaping mechanism may be realized by two different architectures: open loop control and adaptive control. In the open loop configuration, the desired pulse shape at the output of the unit is introduced by the end user through the user interface. Considering that the input pulse has known characteristics, the desired transfer function is known. It would not be difficult for one of ordinary skill to program the SLM using computer 60 (FIG. 1) to provide the desired transfer function if the pulse shaper is precisely calibrated, i.e. the wavelength/pixel and voltage/phase relationship for each pixel are determined and stored in the memory of computer 60. With this approach, in addition to TL pulses, other different pulse shapes including triangular, rectangular, parabolic or any other pulse shape can be formed and then stored in the library of computer 60.

Figure 8:
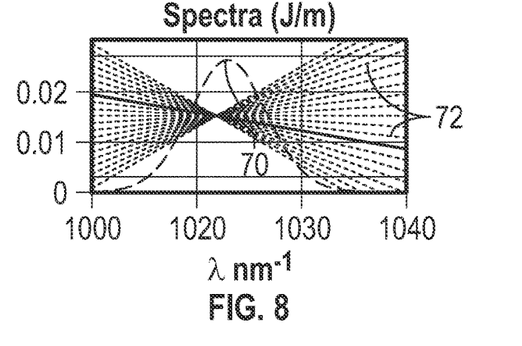
FIG. 8 illustrates the method of operating the disclosed laser unit resulting in a transform limited pulse.
Figure 9A:
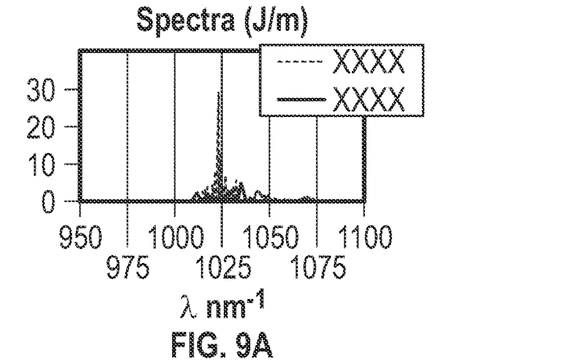
FIG. 9A illustrates a spectrum of pulse measured at a first location downstream from the master oscillator (MO) of the pulse generator as the pulse propagates through the pulse generator.
Figure 9B:
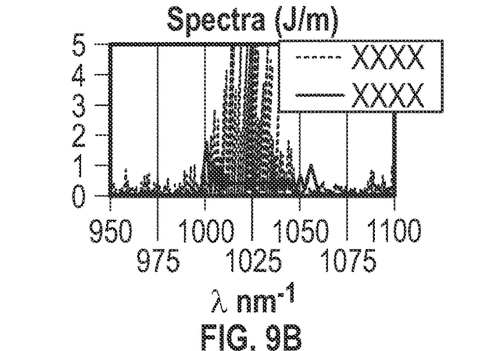
FIG. 9B illustrates a spectrum of pulse measured at a second location downstream from the first location as the pulse continues to propagate through the pulse generator.
Figure 9C:
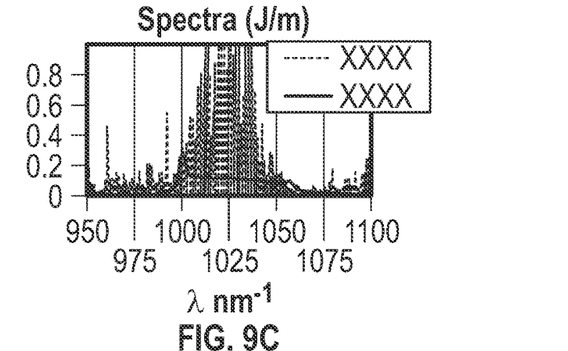
FIG. 9C illustrates a spectrum of pulse measured at a third location downstream from the second location as the pulse continues to propagate through the pulse generator.
Figure 10A:
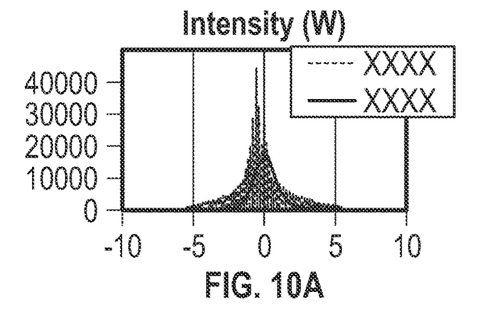
FIG. 10A illustrates the waveform (pulse shape) of the pulse at the first location of FIG. 9A.
Figure 10B:
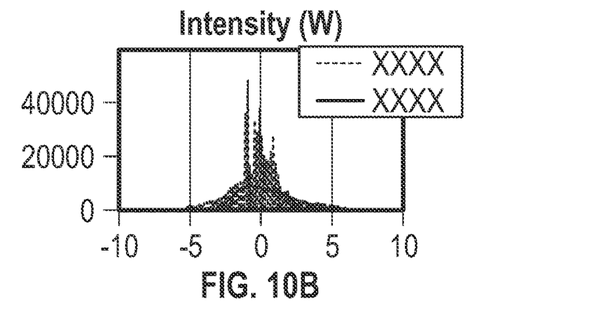
FIG. 10B illustrates the waveform of the pulse at the second location of FIG. 9B.
Figure 10C:
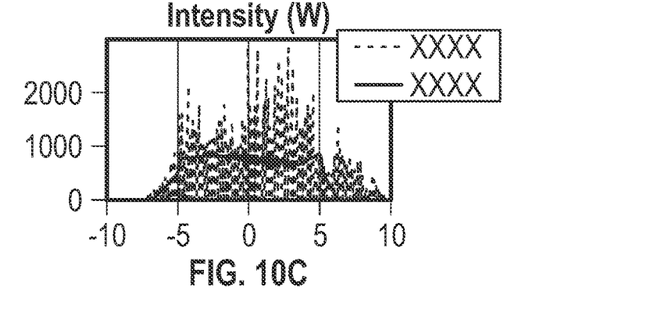
FIG. 10C illustrates the waveform of the pulse at the third location of FIG. 9C.

FIGS. 8-10 illustrate an exemplary method of tuning the disclosed laser unit so that it could meet the customer's requirements to the duration, shape and/or amplitude of the compressed ultrashort pulse. Specifically, the ultimate goal of this method is to provide a customer with freedom to obtain ultrashort pulses of the desired duration, shape and/or amplitude by controllably manipulating a phase and/or amplitude in the disclosed pulse configurable laser unit. For example, in a TL pulse, all the frequencies are locked, and have net zero impedance. In this case, the spectral phase 72 of FIG. 8 is practically horizontal or flat. Generally, a pulse shaper can be defined by a number of parameters, such as the input bandwidth, frequency resolution, maximum delay and others all stored in the memory of computer 60. Additionally, the wavelength to pixel and voltage to phase correspondence are also stored in the memory of computer 60 of FIG. 1-3.

The tuning of the disclosed laser unit is based on the fact that a pulse with a close to Gaussian shape, as shown in FIG. 8, is output by ring resonator 10 and further guided through the schematic of FIGS. 1-3 which has the desired length of the dispersive media. The latter includes all of the components of pulse generator 52 and delivery fibers guiding the broadband coherent chirped pulses to the two-stage compressor. If the schematic of FIG. 5 is used, then the dispersive media also includes all fibers and components of the linearly configured amplifying cascade 62. All of the fibers—passive and active—are standard fibers used by the manufacturer of the disclosed unit.

Determination of a chirp for pulse generator 52, operating in a given regime, i.e., pump power and overlap between filters, is an initial step of tuning the laser unit to be shipped. Once the phase is determined for each pixel, the value with the opposite sign, which nullifies the determined chirp, is stored in the memory of computer 60.

The MIIPS technique uses pulse shaper 54 to place a series of reference phase patterns 72 on a chirped laser pulse and then monitors the spectrum of the second harmonic generation (SHG) response from these reference phase patterns (chirps). This is done to calculate the phase shape of the pulse as a function of wavelength and apply the necessary phase pattern to cancel the chirp of the input beam so as to output a transform limited pulse.

It is possible thus to form a library stored in the memory of computer 60 and including a plurality of different phase and, if necessary, amplitude masks 72 which correspond to certain pulse parameters and thus are configured to compensate the dispersion of the pulse. If the user using an interface requires a new pulse generator regime characterized by a new pump power and filter overlap, computer 60 generates a controlling signal providing the desired change of the laser parameters. The memory of computer 60 also has a software operative to retrieve the desired mask corresponding to a new operating regime and apply it to pulses at the output of the pulse generator so as to receive a TL pulse.

While the above-discussed example relates to TL pulses, pulse shaper 54 can provide other pulse shapes including regular and irregular shapes. The regular pulse shape may, for example, be a flat top pulse, elliptical, train of pulses with a predetermined duty cycle and etc. The irregular pulse shape may include, for example, a two peak pulse having peaks with different amplitudes. Such an automatic correspondence between controlled pulse parameters at the output of the pulse generator, which are stored in the memory of the computer, and corresponding masks, which are also stored in the memory, substantially facilitates the operation and eliminates the need for highly specialized operators. The more complicated pulse shapes at the output of the disclosed pulse shaper may require the application of both phase and amplitude masks to pulses at the output of the pulse generator. For example, if instead of a TL pulse, a simple flat top pulse of the desired duration is needed at the output of the inventive unit, it can be obtained by applying a different phase mask to increase only a liner chirp. However, if one of or both leading and trailing edges of top-flat pulse are required to have a certain angle and curvature, the use of both phase and amplitude masks likely will be needed.

The computer 60 may also have a software operative to help the user knowing only the shape of the desired pulse, but clueless regarding a concrete mask which would provide the pulse with the desired shape in a frequency domain. Using the iterative method, the desired mask can be determined and stored in the library of computer 60.

FIGS. 9A, 9B and 9C illustrate respective spectra of pulse 70 measured at different locations between the output of MO 10 and the input of compressor 56 of FIG. 1 with the location of FIG. 9C being the farthest downstream location from MO 10. FIGS. 10A, 10B and 10C illustrate respective waveforms of pulse 70 taken at the same very locations. As can be seen, as pulse 70 propagates downstream from MO 10 along pulse generator 52, i.e., from the location of FIGS. 9A, 10A to the location of FIGS. 9C, 10C, it acquires both linear and nonlinear chirp portions which become more articulated as the pulse is guided through the dispersive medium. By simply applying different chirps 72 via the interface, the operator can determine which of the chirps provides pulse 70 at the input of shaper 54 with the desired flat spectral line and minimal modulation. Once the mask is determined, pulses 70 can be compressed to a nearly TL pulse. In the example, a normal chirp shown in red in FIG. 8 is optimal for obtaining a near transform-limited pulse.

While the desired characteristics of pulse generator 52 of FIG. 4 advantageously, but not necessarily, remain constant to provide a reliable self-start, the configuration of FIG. 5 obviously may be easily varied so as to have different operational regimes corresponding to different pump powers and mutual position of filters. Each of these regimes and corresponding phase masks, which provide respective nearly TL pulses, also can be stored in the library. It is not unusual, when a nearly TL pulse (within 7% of the theoretical TL pulse) has parasitic low-intensity peaks that can be minimized or completely removed by applying amplitude masks to the nearly formed TL pulse. These masks can be stored in the library.

Typically, the laser system including programmable pulse shaper 54 of FIGS. 1-3 is configured with two processors or computers controlling respective pulse generator and programmable shaper. Adding a full size computer, such as computer 60 in FIG. 1, that can simultaneously control pulse generator 52 and two-stage pulse compressor 54, 56 renders the disclosed unit more flexible and the laser system more efficient.

Typically, if not for a preset including the desired phase applied to the peripheral segments in the above example, a team of specialists including individuals with PhD in physics and computer science in addition to other specialists in the art of the unit's application would be needed to achieve the desired result. Thus, the disclosed unit with a database of stored chirps, which correspond to different phase and amplitude masks, offers a unique opportunity for the customer to efficiently perform a great variety of tasks. Furthermore, the phase mask is device specific which necessitates tuning of each new unit at the manufacturing facility which certainly saves the customer a good fortune. Yet if the customer needs a pulse shape that is not part of the stored information, it is always possible to manipulate the phase and/or amplitude modulating thus a pulse shape, as discussed below.

Figure 11A:
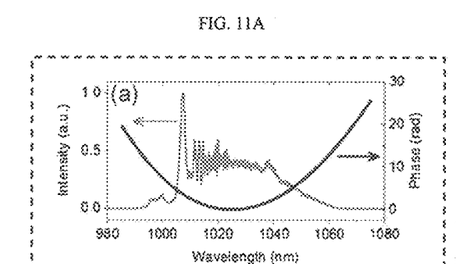
FIG. 11A shows a parabolic phase profile mask added to the output pulse of the pulse generator of FIG. 4 or FIG. 5.
Figure 11B:
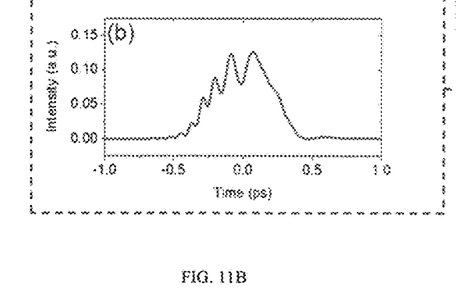
FIG. 11B illustrates the time-domain intensity profile of the optimized pulse of FIG. 11A.
Figure 11C:
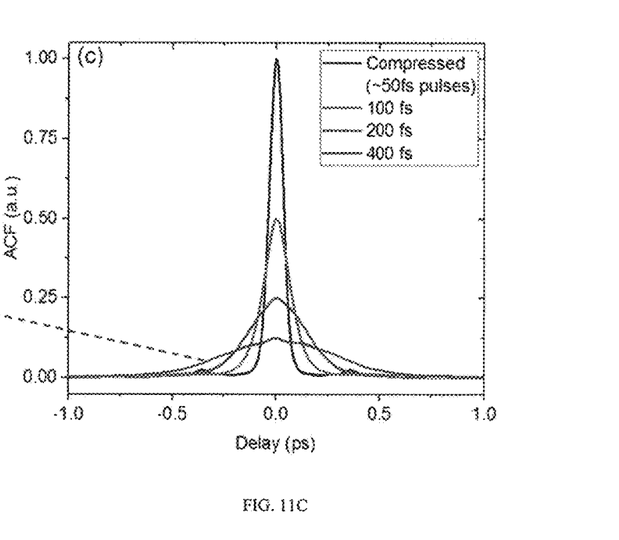
FIG. 11C illustrates measured experimental autocorrelation function (AFC) profiles for 100 fs, 200 fs and 400 fs full width half maximum (FWHM) pulse duration of FIG. 11B.

With the inventive system, it is straightforward to use disclosed shaper to alter the spectral phase to the received chirped pulse and thereby, generate the desired optical waveforms or pulse shapes. The simplest example, as shown in FIG. 11A, is to add a linear chirp (apply a parabolic spectral phase mask) in order to adjust the pulse duration or even the arrival time for the red- and blue-parts of the spectrum. FIG. 11C illustrates measured autocorrelation function (ACF) profiles for several applied chirp values, targeting 100 fs, 200 fs, and 400 fs FWHM pulse duration if estimated from ACF width using sech2 fit. The corresponding SOD values, used to generate the phase masks for the shaper, are 1900 $fs^2$, 3700 $fs^2$, and 7000 $fs^2$ at 1025 nm, respectively. For the latter, FIG. 11A shows the corresponding parabolic phase profile, added to the dispersion compensation mask. The expected time-domain intensity profile of the pulse is provided in FIG. 11B. Note that either positive or negative chirp can be applied, and the SOD magnitude can be as high as 15000 $fs^2$.

Another example is the use of sinusoidal phase modulation for reshaping of the TL pulse into a burst of sub-pulses. The number of sub-pulses and their relative magnitude strongly depend on the phase modulation amplitude. Their time period (spacing) is equal to the spectral phase modulation "frequency" (measured in ps), which can be continuously tuned. For the pulse burst in FIG. 12A, the modulation amplitude is set to 0.45 g, which leads to a pulse sequence with three main sub-pulses of similar magnitude. The calculated phase mask in FIG. 12A and expected time-domain intensity profile in FIG. 12B are given for 0.2 ps spacing between pulses. The latter can be adjusted continuously, with a high precision, by simply tuning the modulation frequency of the sinusoidal phase mask. FIG. 12C shows experimental ACF traces for 0.2 ps, 0.4 ps, and 0.8 ps spacing between pulses. They match simulated ACF profiles for the corresponding parameters (not shown).

Figure 12A:
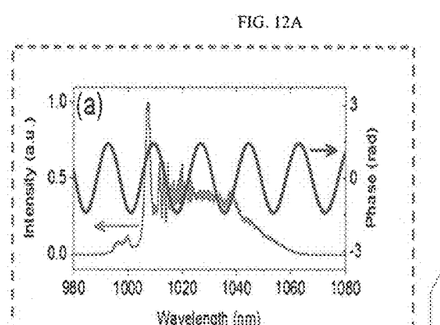
FIGS. 12A, 12B and 12C are illustrations corresponding to respective FIGS. 11A, 11B and 11C except for the sinusoidal phase profile mask applied to the pulse output.
Figure 12B:
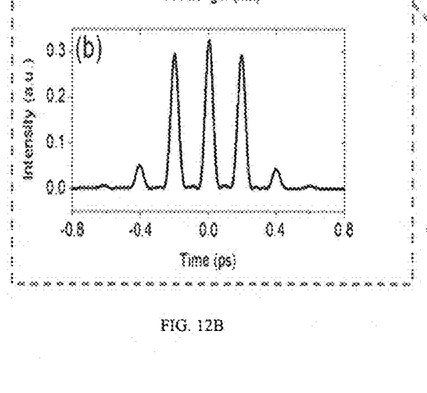
Figure 12C:
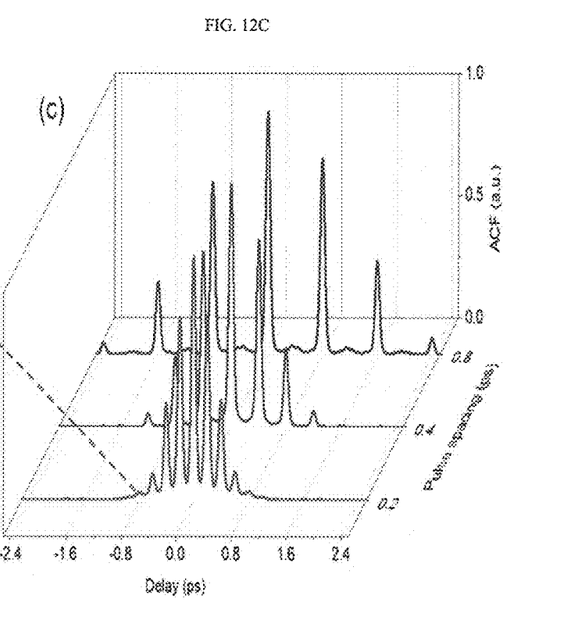

In other words, FIGS. 12A-12C illustrate an exemplary method of breaking the TL pulse of FIG. 12A into a burst of sub-pulses of FIG. 12C by applying a sinusoidal phase mask of FIG. 12A. Changing the parameters of the sinusoidal phase mask, the number of sub-pulses, each of which is closed to a TL pulse, and time delay between the adjacent sub-pulses can be controllably varied.

Figure 13A:
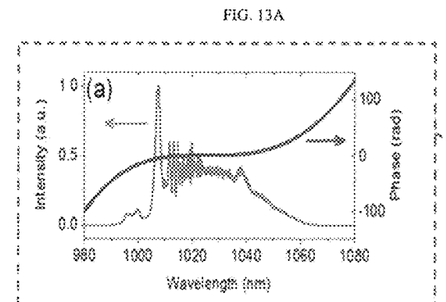
FIG. 13A illustrates a cubic phase profile mask applied to an output pulse of the pulse generator of FIGS. 4 and 5.
Figure 13B:
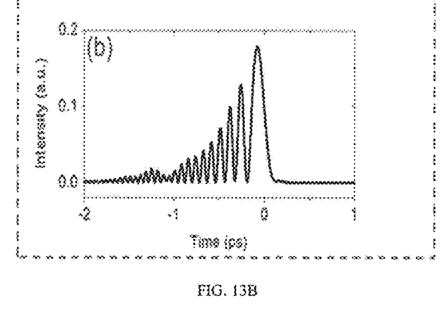
FIG. 13B is a calculated intensity profile of the resulting pulse of FIG. 13A.
Figure 13C:
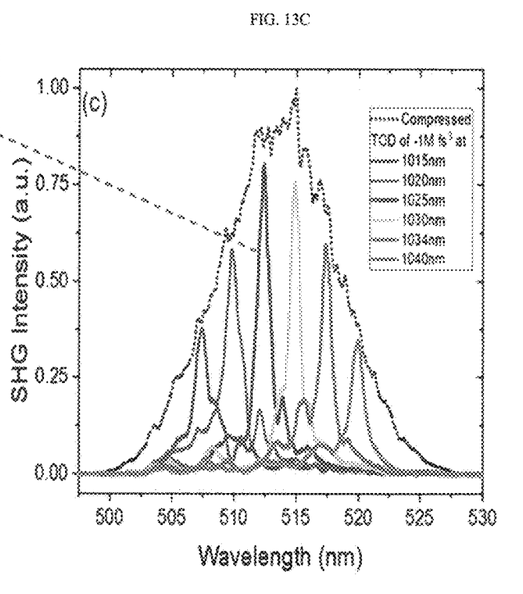
FIG. 13C illustrates experimental second harmonic generation for the cubic mask scanned across the pulse of FIG. 13B.

Phase shaping is an attractive, lossless way to bring selectivity into nonlinear optical processes. It can be illustrated on the second harmonic generation (SHG) process as shown in FIGS. 13A-13C. When ultrashort laser pulses are compressed down to a TL pulse and focused on a thin nonlinear crystal, the dominant contribution into the bell-shaped SHG spectrum comes from sum-frequency generation (SFG) across the laser spectral bandwidth. Laser photons at frequencies $\omega+A$ and $\omega-A$, where A is an arbitrary detuning, add up to produce SHG photons at $2\omega$ and interfere constructively with other contributions because their nonlinear phase $\varphi(\omega+\Delta)+\varphi(\omega-\Delta)$ is independent of detuning A; here, $\varphi(\omega)$ is the spectral phase of the laser pulse. Then, if a phase mask with a proper symmetry is applied, such as, e.g., $\varphi(\omega) \propto (\omega-\omega_0)^3$, constructive interference is preserved only for $\omega_0$, corresponding to frequency $2\omega_0$ in the SHG spectrum.

The latter can be understood by recalling that third order dispersion (TOD) corresponds to a parabolic group delay (in the frequency domain). Spectral bands at frequencies symmetric relative to $\omega_0$, i.e., at $\omega_0+\Delta$ and $\omega_0-\Delta$, are equally delayed and therefore, continue contributing to the signal at $2\omega_0$ frequency through the SFG process. For other SHG frequencies the timing between paired spectral bands drifts suppressing their contribution into the nonlinear signal.

Experimentally, one observes a narrowed SHG spike when a cubic phase is applied. If there are no other phase distortions, the SHG peak is closely tracking the point of symmetry for the cubic phase. That is if the phase mask is centered at 1025 nm, as in FIG. 13A, the SHG peak is expected to be at 512.5 nm. By changing the center frequency/wavelength of the cubic phase mask, one effectively tunes the two-photon excitation band. Note that the strength of the two-photon peak when TOD is applied is similar to what one gets using compressed pulses; i.e., the entire spectral bandwidth of the shaped pulse contributes towards the two-photon transition at $2\omega_0$.

Thus, FIGS. 13A-13C illustrate another example of reshaping the TL pulse by applying a nonlinear phase mask having a relatively flat central region and two curved end regions. The resulting pulse is extended in time, as shown in FIG. 13B and, in addition, the pulse is modulated having a series of peaks with the leading peak having a highest intensity, as seen in FIG. 13B.

Such a reshaping may be advantageously used in multiple applications in chemistry, biology and medicine when coloring a substance, molecules and etc., by markers or luminophores. Different markers can be excited in response to respective different wavelengths. For example, searching for the pathological formations, it is known that the markers of one color is attached to a healthy tissue, whereas the markers of a different color are in contact with the pathological tissue.

The disclosed unit may operate generating low energy fs pulses to avoid damage to any tissue. The fs pulses are characterized by a broad spectral width with the fs pulse each having about 200 nm width. As known to one of ordinary skill, the entire visible diapason is less than 300 nm with the clearly visible spectral region not exceeding 200 nm. Thus an individual fs pulse can excite the markers of different colors corresponding to respective different tissues which, of course, complicates the discrimination process and affects the diagnosis.

The disclosed laser unit, however, solves this problem by applying such a mask that can selectively excite a very narrow spectral region. If the phase mask applied to the pulse in FIG. 13A was flat, the SHG would have a single continuous spectral range between 500 nm to about 530 nm, as shown in FIG. 13C by the dot line. But since the disclosed unit can controllably change the phase mask from, for example, the flat one to the one shown in FIG. 13A, the same very spectrum would have individual narrow SHG spectral regions illustrated by respective peaks of different colors in FIG. 13C. Thus, despite the great number of spectrally close markers, it is possible to selectively or consecutively excite one marker after another while analyzing individual response signal intensities until the marker corresponding to the tissue to be searched is identified.

Figure 14:
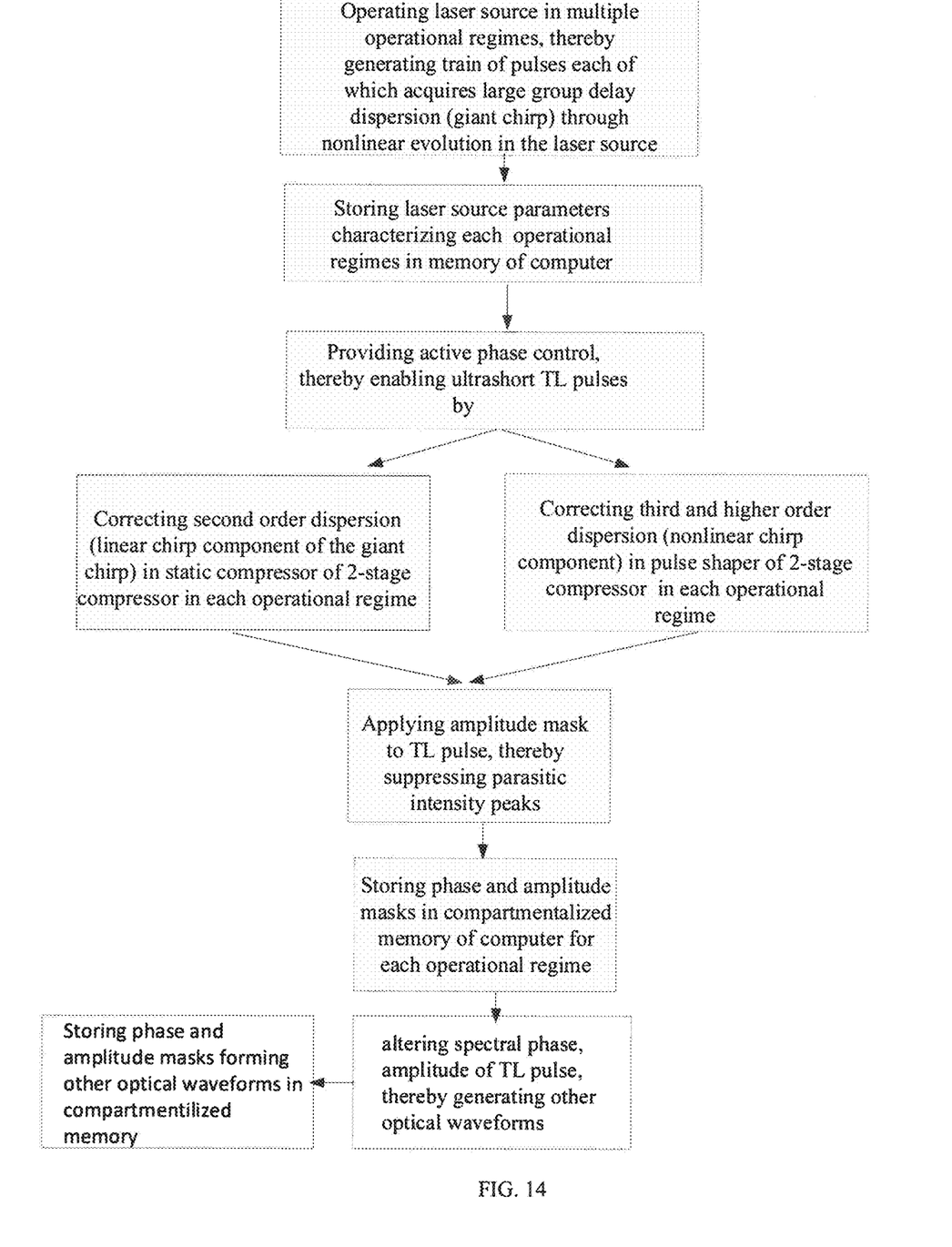
FIG. 14 is a general flow diagram representing the inventive method of tuning and operating the fiber laser unit of FIGS. 1-3.

FIG. 14 illustrates the above disclosed method of tuning and operating of inventive unit 50 of FIGS. 1-3. The laser source 52 operates in different operational regimes depending on the intensity of pump light coupled into a gain medium. The parameters of respective operational regimes are stored in a compartmentalized memory storage of computer 60.

The generated pulses each while propagating through a dispersive medium, i.e., all fibers and fiber elements constituting laser source 52, acquires a large group delay dispersion or giant chirp. The giant chirp is regime specific. The giant chirp includes a linear component corresponding to the SOD and nonlinear component corresponding to TOD or higher orders dispersion. Both chirp components should be corrected in order to form a TL pulse. The active phase control realizes the correction of the components.

The 2-stage pulse compressor realizing the phase control includes static compressor 56 and programmable pulse shaper 54 which are operative to correct respective linear and nonlinear chirp components. A resulting pulse is nearly a TL. However, its waveform is not ideal exhibiting parasitic intensity peaks which can be suppressed by applying an amplitude mask to the nearly TL pulse which may be sufficient to obtain the desired TL pulse. The phase and amplitude masks corresponding to respective operational regimes of the laser source form the library stored in the compartmentalized memory of the computer.

Upon obtaining the desired TL pulse for respective regimes, their shape can be altered to generate other optical waveforms corresponding to respective operational regimes. This is realized by applying phase or phase/amplitude masks to the TL pulse. Once the desired waveform is formed, corresponding masks are stored in the memory of the computer.

Although shown and disclosed is what is believed to be the most practical and preferred embodiments, it is apparent that departures from the disclosed configurations and methods will suggest themselves to those skilled in the art and may be used without departing from the spirit and scope of the invention as defined in the appended claims.

The invention claimed is:

1. A pulse configurable laser unit (PCLU) outputting uniform ultrashort pulses, comprising:
   a fiber pulse generator operating in a plurality of operational regimes to output a train of coherent uniform amplified giant chirped broadband pulses along a light path, the fiber pulse generator being a self-starting passively mode-locked fiber seed which has two identical groups of optical elements defining a ring resonator;
   a two-stage compressor including
      a static compressor, which is configured to compensate for a linear chirp component of each giant chirped broadband pulse, and
      a pulse shaper which is provided with a programmable spatial light modulator (SLM) to correct for a nonlinear chirp component of the giant chirped broadband pulse, wherein the two-stage compressor outputs a train of transform limited (TL) ultrashort coherent pulses in each of the operational regimes of the fiber pulse laser generator; and
   at least one or more computers executing a software for selectively retrieving a phase mask corresponding to a given operational regime from a library of phase masks, which is stored in a memory of the CPU, and operating the pulse shaper to apply the retrieved mask across to the programmable spatial light modulator (SLM) of the pulse shaper so as to compensate for the nonlinear chirp component of each giant chirped pulse.

2. The PCLU of claim 1, wherein the computer executes the software for retrieving an amplitude mask from a library of amplitude masks, which are stored in the memory of the CPU, and apply the retrieved amplitude mask across a programmable spatial light modulator (SIM) of the pulse shaper to suppress parasitic intensity peaks present in a spectrum of the TL pulse.

3. The PCLU of claim 1, wherein the computer executes the software for retrieving a phase mask from the library of phase masks and applying the retrieved phase mask across the SLM of the pulse shaper to reshape the TL pulse into a pulse differing from the TL pulse, but having a desired shape for the given operational regime of the pulse generator.

4. The PCLU of claim 3, wherein the computer executes the software for retrieving an amplitude mask from a library of amplitude masks phase masks and applying the retrieved amplitude mask across the pulse shaper to refine the desired shape of the pulse different from the TL pulse.

5. The PCLU of claim 1, wherein the pulse shaper is configured with is a spatial light modulator (SLM) including a liquid crystal spatial light modulator (LC SLM), liquid crystal phase (LCOS), an acousto-optical modulator (AOM) or an acousto-optical programmable dispersive filter (AOPDF).

6. The PCLU of claim 1, wherein the software executed by the computer measures and corrects phases of spectral pulse components in accordance with a multiphoton intrapulse interference phase scan (MIIPS) algorithm.

7. The PCLU of claim 1, wherein the optical elements of each groups include an Yb doped active fibers, fiber coil and narrow line spatial filter, the spatial filters of respective groups being configured to have respective spectrums overlapping one another, the elements being optically coupled to one another by a plurality of passive fibers.

8. The PCLU of claim 7, wherein the pulse generator further includes a fiber booster, the fiber booster being configured with the elements defining the ring resonator but coupled to one another such that the booster has a linear geometry, the active and passive fibers of the booster having respective substantially uniformly dimensioned cores larger than substantially uniformly dimensioned cores of respective elements of the ring resonator.

9. The PCLU of claim 1, wherein the pulse shaper is one-dimensional or two dimensional.

10. The PCLU of claim 4, wherein the phase and amplitude masks applied to the TL pulse to provide the pulse with the desired shape which includes regular and irregular shapes in time and frequency domains.

11. The PCLU of claim 1, wherein the self-starting passively mode-locked fiber seed outputs a train of coherent broadband chirped coherent pulses at up to 20 MHz pulse repetition rate, each pulse having an energy of up to 50 nJ and a full spectral bandwidth of up to 100 nm.

12. The PCLUm of claim 8, wherein the pulse generator having the fiber booster yields a train of coherent broadband chirped coherent pulses at up to 20 MHz pulse repetition rate, each pulse having a full spectral bandwidth of up to 100 nm and a pulse energy of up to 500 nJ.

13. A method of generating ultrafast pulses, comprising:
   (a) operating a self-starting passively mode-locked fiber seed in a plurality of operational regimes, thereby generating a train of pulses, wherein each pulses acquires a giant chirp through a nonlinear evolution of the pulse in the laser source, wherein the fiber seed has two identical groups of optical elements defining a ring resonator;
   (b) compressing the chirped pulses to respective transform-limited (TL) pulses in each of the operational regimes by:
      correcting the linear component of the giant chirp, and
      correcting the nonlinear component of the giant chirp by applying a spectral phase mask to the chirped pulse upon retrieving the applied phase mask from a computer library, wherein multiple phase masks are generated to correspond to respective operational regimes;
   (c) shaping the TL pulses corresponding to respective operational regimes by applying spectral phase masks or spectral phased masks and amplitude masks retrieved from the computer library, thereby generating desired pulse shapes of respective TL pulses.

14. The method of claim 13, wherein the step (c) further comprises applying amplitude masks stored in the library and corresponding to respective operational regimes, thereby suppressing parasitic low intensity pulses in an intensity profile of each TL pulse.

15. The method of claim 13 further comprising storing source parameters corresponding to respective operating regimes in the library of a computer memory.

* * * * *